United States Patent [19]

Londt et al.

[11] Patent Number: 4,998,592

[45] Date of Patent: Mar. 12, 1991

[54] PASSIVE MECHANICAL DAMPING SYSTEM FOR A TRUCK

[75] Inventors: Edward E. Londt, Fort Wayne; Duane S. Robinson, New Haven, both of Ind.

[73] Assignee: Navistar International Transportation Corp., Chicago, Ill.

[21] Appl. No.: 536,818

[22] Filed: Jun. 12, 1990

[51] Int. Cl.$^5$ ............................................. B62D 33/10
[52] U.S. Cl. .................. 180/89.12; 180/300; 248/562; 248/636; 296/35.1
[58] Field of Search ............... 180/89.14, 89.15, 89.16, 180/89.12, 300; 296/35.1, 190; 248/562, 636, 638; 267/114

[56] References Cited

U.S. PATENT DOCUMENTS

| | | | |
|---|---|---|---|
| 1,445,486 | 2/1923 | Cats | 267/35.1 |
| 2,564,888 | 8/1951 | Foley | 296/35.1 |
| 3,010,757 | 11/1961 | De Haan | 296/35 |
| 3,642,316 | 2/1972 | Porth | 180/89.15 |
| 3,768,828 | 10/1973 | Klein | 280/702 |
| 3,841,694 | 10/1974 | Merkle | 296/35.1 |
| 3,847,244 | 11/1974 | Fairbanks, Jr. | 296/35.1 |
| 3,944,017 | 3/1976 | Foster | 180/89.15 |
| 3,966,009 | 6/1976 | Meacock et al. | 180/89.15 |
| 4,438,970 | 3/1984 | Boucher | 296/190 |
| 4,671,227 | 6/1987 | Holloweger et al. | 248/636 |
| 4,871,189 | 10/1989 | Van Breeman | 280/711 |

Primary Examiner—Charles A. Marmor
Assistant Examiner—Karin Tyson
Attorney, Agent, or Firm—F. David AuBuchon; Dennis K. Sullivan

[57] ABSTRACT

A passive mechanical damping system, particularly for the suspension of a cab from a truck frame, provides a minimal level of damping force to impede the free movement of a truck cab about its nominal height and also provides higher levels, progressively or in discrete steps, of damping as the movement of the cab exceeds preset limits of displacement defined by a lost motion connection to provide maximum vibration isolation while providing additional damping to control cab movement when the preset displacement limits are exceeded. The system provides a low rate viscous damper continuously connected between the cab and the truck frame and a high rate viscous damper connected therebetween through a lost motion connection.

10 Claims, 1 Drawing Sheet

U.S. Patent  Mar. 12, 1991  Sheet 1 of 1  4,998,592
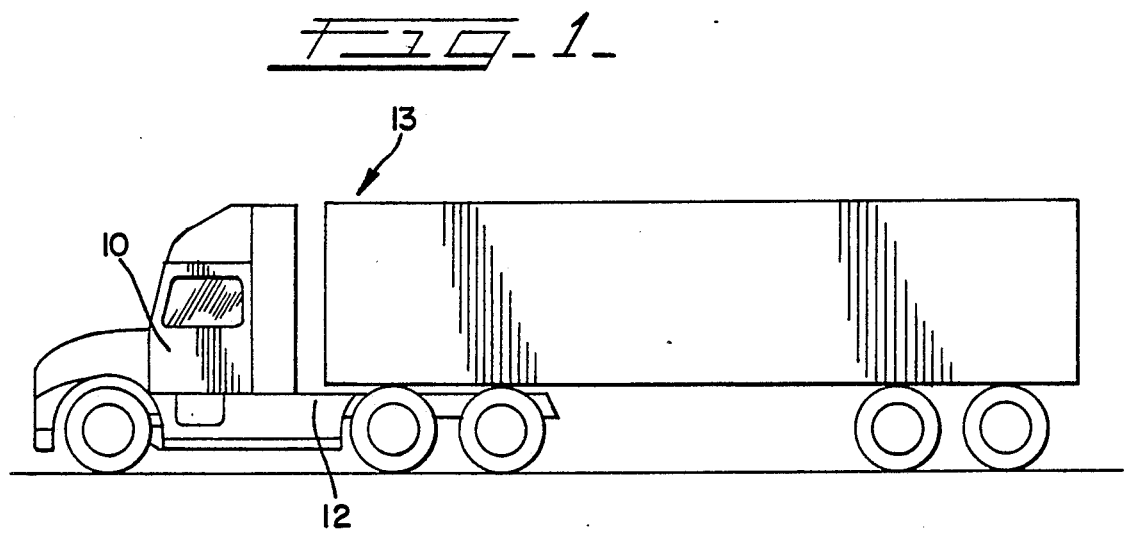
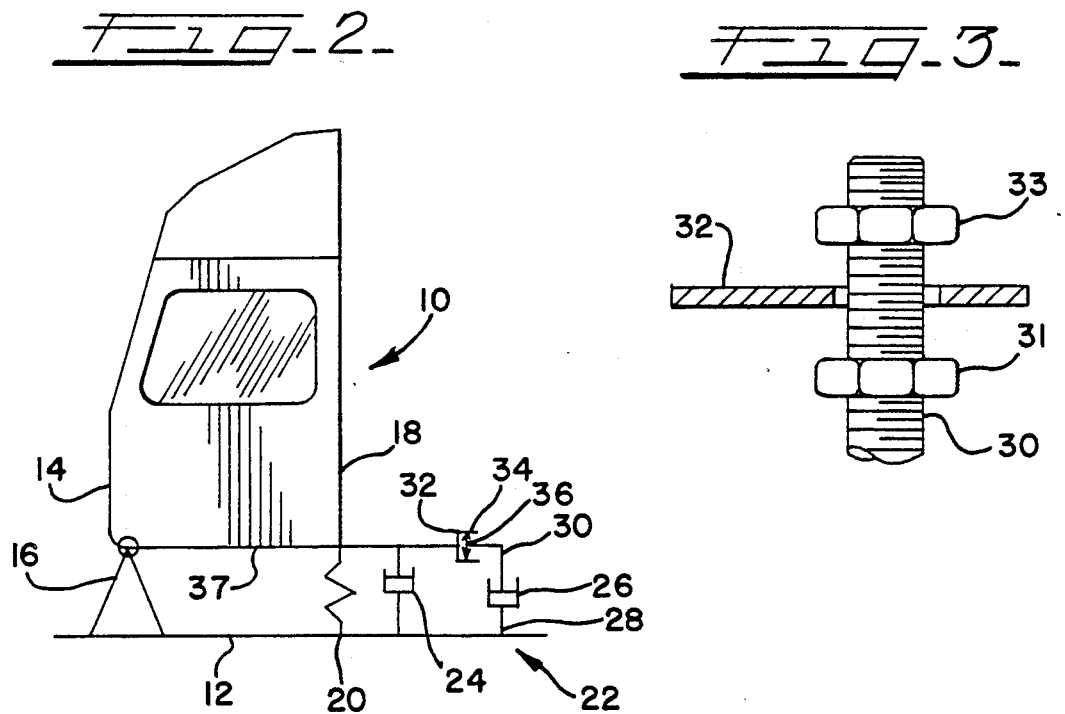

PASSIVE MECHANICAL DAMPING SYSTEM FOR A TRUCK

BACKGROUND OF THE INVENTION

The present invention relates to a passive mechanical damping system for a truck which provides a minimal level of damping force to impede the free movement of a suspended mass, particularly the cab of the truck, within a preset range about its current height or travel location and also provides higher levels, progressively or in discrete steps, of damping as the movement of the suspended mass of the cab exceeds the preset limits of displacement.

DESCRIPTION OF THE PRIOR ART

Many automobile companies have introduced semi-active shock absorber systems onto the market which provide varying levels of viscous damping which may be controlled by electronic systems.

Many current cab mounting systems use elastomeric isolators of relatively high stiffness to provide some sprung mass vibration isolation and to isolate the cab from twisting movements of the truck frame. The high isolator stiffness provides displacement control of the sprung mass to keep the cab within defined generally small displacement limits. The high stiffness of these cab mounting isolators precludes the effective isolation of the cab from many common vibrational inputs.

Other cab mounting systems, commonly called cab suspensions, use substantially lower stiffness mounting isolators, thereby allowing a substantially larger amount of relative movement between the cab and the frame. The damping in these cab suspensions is most commonly achieved through the use of hydraulic viscous dampers, i.e. shock absorbers. However, the typical cab suspensions available today are not as effective as possible because they must use damping levels that are high enough to prevent excessive cab movement under resonant conditions existing in the cab and cab suspension system. This level of damping is too high to provide optimal isolation of the cab over the rest of the vibration spectrum.

For example, U.S. Pat. No. 3,966,009 to Meacock, II et al. discloses a truck cab mounting arrangement which minimizes the fore-and-aft motion of the cab caused by vibratory bending of the frame and by pitching of the truck, while reducing vertical motion of the cab. One portion of the cab is resiliently mounted on the frame at or near a nodal point. Preferably, the resilient mount includes at least one pneumatic spring. Another portion of the cab is secured to the frame by a pivotal support that transmits to the cab vibratory movement of the frame at the support.

U.S. Pat. No. 4,871,189 to Van Breeman discloses a truck cab suspension system which includes a means for fine-tuning the frequency response of the spring mass system to isolate all modes of the truck frame and still control hard jounces. The suspension system includes at least one air spring communicating with an air reservoir, a hydraulic shock absorber, and a height control valve. The air reservoir serves to lower the spring rate of the air spring, and an orifice between the air spring and air reservoir creates a nonlinear damping effect.

U.S Pat. No. 3,768,828 to Klein discloses the addition of an auxiliary shock absorber in a truck front suspension in order to accommodate heavier loads. However, there is no difference taught between the operating characteristics of the two shock absorbers disclosed therein. Nor is the lost motion connection of the present invention disclosed.

SUMMARY OF THE INVENTION

Accordingly, it is an object of the present invention to provide a suspension system wherein frictional damping forces are used to control sprung mass movement only when needed and without an electronic control system or associated sensors, thus providing truck ride enhancement with a relatively minor commitment of resources.

A further object of the present invention is to provide a suspension system which will accommodate existing primary steel, composite, or elastomeric springs or air bag suspensions of all types and provide significant improvement in truck ride by introducing frictional damping forces only when needed to control sprung mass movement outside the limits of those achieved by the primary suspension system.

These objects are specifically met in a passive mechanical damping system, particularly for a truck cab, which provides minimal damping force to impede the free movement of a truck cab within a predetermined range about its nominal height or location above the truck chassis and then provides higher levels, progressively or in discrete steps, of damping as the movement of the suspended mass of the cab exceeds preset limits of cab-to-frame relative displacement. The truck cab is pivotally mounted at its forward end to the truck frame while the rear end is supported by a primary suspension, for example, an air spring. A low rate damper is effectively mounted to the rear end of the cab for continuous movement therewith while a high rate damper is mounted through a lost motion connection to the cab rear end and is effective only when the cab-to-frame motion extends beyond the limits defined by the lost motion connection, i.e. the predetermined minimal damping range.

The system thus provides maximum isolation within the minimal damping range while adding damping to control the movement of the suspended cab, when the preset limits are exceeded. An important characteristic of the system proposed herein is that the location of the minimal damping range relative to the frame varies during operation due to cab loading, wind loading, road conditions, and even the normal operation of the cab suspension, i.e., the range moves with the cab rather than remaining a fixed distance from the frame. For example, although a heavily loaded cab might be closer to the frame than a lightly loaded cab, both cabs would have the same size minimal damping range within which maximum vibration isolation is provided.

BRIEF DESCRIPTION OF THE DRAWINGS

Other objects and advantages of the invention will become more apparent upon perusal of the detailed description thereof and upon inspection of the drawings in which:

FIG. 1 is a side elevation of an articulated semi-trailer truck incorporating the present invention;

FIG. 2 is a mechanical diagram illustrating the mounting of the cab of the truck of FIG. 1 to the frame by the passive mechanical truck suspension system of the present invention; and FIG. 3 is a side view partly in section of a lost motion connection of the invention.

DESCRIPTION OF THE PREFERRED EMBODIMENT

Referring now to the drawings, there is illustrated a truck cab 10 mounted to a frame 12 of a semi-trailer truck 13. The cab 10 is mounted to the frame 12 at a forward end 14 thereof by pivotable mounting members 16, in a known manner.

A rear end 18 of the cab 10 is supported above the frame 12 by a rear support member 20, which may take the form of a steel, composite, or elastomeric spring 20 or a conventional air spring controlled by a conventional levelling valve (not shown). The spring 20 is designed so that the cab floor 37 is maintained in an approximately horizontal plane. Although the support spring 20 is necessary to maintain the cab 10 relatively level, the spring 20 itself cannot provide adequate low level damping as movement of the suspended mass of the cab 10 takes place and also provide a maximum level damping effect when movement of the suspended mass of the cab 10 exceeds preset limits.

In accordance with the invention, an auxiliary passive mechanical damping system 22 is provided for the cab. The system 22 provides minimum or no damping within a defined range of cab motion, and, when the preset cab motion limits are exceeded, substantial additional damping, either progressively or in discrete steps, to control the movement of the suspended mass of the cab 10.

As shown, the system 22 includes a primary hydraulic viscous damper or dash pot 24 which is mounted between the rear end of cab 10 and frame 12. This primary viscous 24 is realized by a low damping rate conventional shock absorber, wherein the force resisting movement is very low, compared to a normal shock absorber for a truck, for a given relative velocity between cab and frame, the primary viscous damper 24 being continuously connected between the cab and the frame. The damping rate of damper 24 will be only enough to prevent unwanted small oscillations of the cab about its nominal operating height and will have little effect on limiting the displacement of the cab 10.

A secondary viscous damper 26 is also incorporated into the system 22. The secondary viscous damper 26, however, is realized by a high damping rate viscous damper, wherein the force resisting movement is very high for a given relative velocity between cab and frame, which comes into play only during excursions of the cab 10 beyond the predetermined minimal damping range. The damping rate is high enough to substantially limit cab motion and prevent the primary cab suspension 20 from bottoming or topping out during extreme excursions of the cab from the approximate centered position. The operation of the secondary viscous damper 26 under normal conditions, which normally would provide an extremely rough ride even on the highway, is of no concern here because of the lost motion connection 34 as will be seen hereinbelow.

The secondary viscous damper 26 is connected at one end 28 thereof to the truck frame 12. The other end 30 of the secondary viscous damper 26 floats within a lost motion connection 34 disposed between the damper 26 and a cab member 32 which isolates the secondary viscous damper 26 from the primary viscous damper 24 and the primary suspension spring 20 unless the limits of the lost motion connection 34 are reached.

The lost motion connection 34 thus forms or defines a "rattle space" or minimal damping range 36 between the truck cab 10 and frame 12 which may be easily realized, as shown in FIG. 2. Alternatively, as shown in FIG. 3, the threaded upper arm 30 of the secondary viscous damper 26 may be threaded and have a first lock nut 31 mounted thereon and then be fed through an opening in the bracket 32 attached to the cab 10, while the cab is suspended in its normal position by the primary suspension 20, until the nut stops a predetermined distance short of the opening, defining the range between the normal position and the lower limit of the minimal damping range. Then, a second lock nut 33 may be placed over the threaded upper arm 30 at a predetermined distance from the first nut, defining the upper limit of the minimal damping range, thereby securing the arm 30 to the cab 10 through the lost motion connection 34 in a centered position therewithin, allowing free play between the cab 10 and the secondary viscous damper 26 within the minimal damping range limits created by the nuts, which act as limiting devices here.

In operation, when the truck 13 is moving along a road with the cab suspended relative to the frame 12 by the spring 20, various levels of vibration and pitching of the cab 10 relative to the frame 12 will be encountered, the spring 20 being provided only to maintain the cab 10 in a more or less horizontal plane while permitting movement of the cab. During the course of travel, some movements of the cab 10 are very small, such as on a smooth highway, while other movements are extremely large, such as when travelling off road or over surfaces having large pot holes therein. The extreme conditions bring the secondary viscous damper 26 into effect.

When small vibrations caused by normal road surface travel come into play, the primary viscous damper 24, a low rate viscous damper 24, dampens small vibrations which are not compensated for by the spring 20 due to its inability to compensate for low level vibrations. Otherwise, the ride that is produced by the use of such spring 20 alone often would transfer a significant amount low level vibration to the operator within the cab 10. To compensate for such low level vibration, the primary viscous damper 24 is positioned in such a manner as to take into account such low level vibrations and dampen, if not altogether eliminate, such vibrations from being transmitted to the cab 10.

At the other extreme, when the truck 13 is traveling over rough terrain or encounters a pot hole in a highway, the spring 20 and primary viscous damper 24 will be incapable of adequately damping the large excursions of the cab caused by traveling over such terrain due to the low damping level of viscous damper 24. When these large excursions occur, the secondary viscous damper 26, a high rate viscous damper 26, connected to cab 10 through the lost motion connection 34 comes into play.

Upon engagement of the lost motion connection 34, the bracket 32 to which the upper arm 30 of the high level viscous damper 26 is engaged will be moved, causing one or the other abutment surface of bracket 32 of the lost motion connection 34 to force the upper arm 30 of the viscous damper 26 to move downwardly or upwardly, as required, and thereby dampen cab motion beyond the limits of the lost motion connection.

It has been found through empirical testing that a range of motion of approximately ¾ inch in the lost motion connection 34 provides a good degree of low level vibration damping and also provides effective control of extreme excursions of the cab beyond the preset limits. When these limits, within which only the primary viscous damper 24 is to function, are exceeded, the lost motion connection, in effect, actuates the high rate viscous damper 26 of the system 22. Therefore, since the low level viscous damper 24, although operating, will have little or no effect during these cab excursions in comparison to the effect generated by the high level viscous damper 26, only one viscous damper, either low rate viscous damper 24 or high rate viscous damper 26 is effective at one time.

During operation of the truck, the relative position of the cab 14 to the frame 10 may vary, for example, because of increased aerodynamic loading on the cab and spring 20 at higher road speeds. With the increased load, the cab will go to the lower end of the lost motion connection 34 and nudge the rod 30 further into the damper 26. If this is done slowly, the rod will retract into the damper with little effect because the motion resistive effect of a hydraulic viscous damper such as damper 26 varies with velocity. If done quickly, a higher damping force may briefly occur. However, with the new loading condition, assuming it continues, a new position for the minimal damping range relative to the frame 12 will be established. Because a hydraulic viscous damper provides the same motion resistive effect anywhere within its effective range, the lost motion connection 34 will be equally effective in this new position to provide maximum vibration isolation for low displacements and high damping for large displacements. Normal cab oscillation will soon result in the center of the minimal damping range provided by the lost motion connection assuming a position near the center of motion.

Although the simple mechanical diagram of FIG. 2 shows the high rate viscous damper 26 to be located significantly behind the low rate viscous damper 24, which is significantly behind the air spring 20 of the cab 10, it will be understood that these components of the passive mechanical truck cab suspension system 22 could, in actuality, be mounted transversely on a cross member (not shown) of the truck frame 12 allowing the viscous dampers 24 and 26 to create the appropriate effect, as required.

It will be further appreciated by those of ordinary skill in the art that the foregoing suspension system may find application to the suspension of the operator's seat within the cab wherein the system 22 is disposed between the bottom of the seat and the cab floor or understructure. Additionally, the system 22 might be applied to suspend the truck frame relative to the axles or wheels of the truck.

It will be understood that the passive mechanical truck suspension system of the invention has a number of advantages, some of which have been described above, and others of which are inherent. It will also be apparent to those of ordinary skill in the art, upon reading the foregoing description, that numerous variations and modifications can be made to the invention without departing from the teachings herein. For example, the lost motion connection 34 could be located between the viscous damper 26 and the frame 12. Accordingly, the scope of the invention is only to be limited as necessitated by the accompanying claims.

What is claimed is:

1. A passive mechanical damping system for use in a suspension of a component of a truck relative to a frame thereof, said truck having a primary suspension spring disposed between said truck frame and said component, comprising:

a primary damper continuously engaged between said truck frame and said component, said primary damper generating a low resistive force in response to telescoping movement thereof; and a secondary damper mounted between said truck frame and said component, said secondary damper generating a high resistive force in response to telescoping movement thereof, one end of said secondary damper being engaged within a lost motion connection disposed between said frame and said component, said secondary damper becoming active to resist relative movement between said component and said frame upon said component being displaced an amount relative to said frame sufficient to take up said lost motion connection;

said damping system providing minimal damping at low levels of component movement and high damping during excursions of said component beyond preset limits defined by said lost motion connection.

2. The damping system of claim 1 wherein said secondary damper is a viscous damper.

3. The damping system of claim 2 wherein the position of the range of movement of said lost motion connection relative to said frame is variable depending on the relative position of said component relative to said frame.

4. The damping system of claim 3 wherein said primary damper is a viscous damper continuously engaged between said component and said frame.

5. A passive mechanical truck cab suspension system for suspending a cab of a truck relative to a frame thereof, said suspension system providing minimal damping at low levels of cab movement and high damping during excursions of the cab beyond predetermined limits, comprising:

primary spring means operatively disposed between said truck frame and said cab;

a primary damper engaged between said truck frame and said cab, said primary damper generating a low resistive force in response to telescoping movement thereof; and a secondary damper mounted between said truck frame and said cab, one end of said secondary damper being engaged within a lost motion connection disposed between said frame and said cab, said secondary damper generating a high resistive force in response to movement thereof, said secondary damper becoming active to resist relative movement between said cab and said frame upon said cab being displaced an amount relative to said frame sufficient to take up said lost motion connection.

6. The suspension system of claim 5 wherein said secondary damper is a viscous damper.

7. The suspension system of claim 6 wherein the position of the range of movement of said lost motion connection relative to said frame is variable depending on the relative position of said cab relative to said frame.

8. The suspension system of claim 5 wherein said primary damper is a viscous damper continuously engaged between said cab and said frame.

9. The system of claim 5 wherein said lost motion connection comprises a first nut engaged over a threaded end of said secondary damper, a frame portion of said cab engaged onto said threaded end and said first nut and a second nut engaged over said frame portion onto said threaded end of said damper at a predetermined distance from said first nut.

10. The system of claim 5 wherein said predetermined distance is approximately $\frac{3}{4}$ inch.

* * * * *